(12) United States Patent
Ong et al.

(10) Patent No.: US 9,608,835 B2
(45) Date of Patent: Mar. 28, 2017

(54) METHOD AND APPARATUS FOR CREATING A SMART NETWORK

(71) Applicants: Siang Pheng Ong, Desa Parkcity (MY); Lee Shyuan Heng, Bukit Mertajam (MY)

(72) Inventors: Siang Pheng Ong, Desa Parkcity (MY); Lee Shyuan Heng, Bukit Mertajam (MY)

( * ) Notice: Subject to any disclaimer, the term of this patent is extended or adjusted under 35 U.S.C. 154(b) by 0 days.

(21) Appl. No.: 15/158,332

(22) Filed: May 18, 2016

(65) Prior Publication Data

US 2016/0344570 A1 Nov. 24, 2016

Related U.S. Application Data

(60) Provisional application No. 62/162,985, filed on May 18, 2015.

(51) Int. Cl.
*H04B 10/07* (2013.01)
*H04L 12/28* (2006.01)
*H04W 4/00* (2009.01)

(52) U.S. Cl.
CPC ...... *H04L 12/2807* (2013.01); *H04L 12/2816* (2013.01); *H04L 2012/2841* (2013.01); *H04W 4/008* (2013.01)

(58) Field of Classification Search
CPC .......... H04B 10/07955; H04B 10/0773; H04L 12/2807

USPC ......... 455/68, 456.1, 452.1, 509, 67.11, 418, 455/419
See application file for complete search history.

(56) References Cited

U.S. PATENT DOCUMENTS

| | | | | |
|---|---|---|---|---|
| 2002/0181944 A1* | 12/2002 | Kawahara | ............. | G11B 15/07 386/326 |
| 2005/0034160 A1* | 2/2005 | Kim | .................... | H04L 12/2805 725/80 |
| 2015/0326958 A1* | 11/2015 | Bernard | ............... | H04B 10/038 398/38 |
| 2015/0334696 A1* | 11/2015 | Gu | ...................... | H04L 67/1095 718/1 |

\* cited by examiner

*Primary Examiner* — John J Lee

(57) ABSTRACT

A method and apparatus for creating a smart network of control devices includes a master control device and a plurality of programmable control devices; the master control device having a wireless transmission unit and each of the plurality of programmable control devices having a wireless communication unit being configured for wireless communication between the master control device and the programmable control devices. The master control device is positioned within close proximity to one or more of the plurality of programmable control devices in order to send a configuration signal that is used to add the one or more programmable control devices to the network of control devices; a unique identifier being allocated to each of the programmable control devices added to the network of control devices. In the same way, one or more of the programmable control devices can be removed from network of control devices.

15 Claims, 12 Drawing Sheets

METHOD AND APPARATUS FOR CREATING A SMART NETWORK

The current application claims a priority to the U.S. Provisional Patent application Ser. No. 62/162,985 filed on May 18, 2015.

FIELD OF THE INVENTION

The present invention relates generally to smart networks. More specifically, but not exclusively, the present invention concerns a method of creating and configuring a smart network, and an apparatus for the creation and configuration of a smart network.

BACKGROUND OF THE INVENTION

Smart networks may be used to control electronic systems and devices within a home, business, or industrial environment. Examples of a smart network include a domestic lighting system which may be controlled by a smart system control device or a user's smart phone. A user may turn lights off when leaving a house without having to physically turn off each light switch. Alternatively, heating devices may be controlled remotely, with a user sending commands to the heating devices via a smart control device or smart phone or computer connected to the internet or within a Local Area Network (LAN).

In order to create such a smart network, each control device connected to the various elements within the network must include a unique identity or address in order that each element may be individually controlled. There are various ways in which each control device may be addressed, and the network configured as a result. One such method comprises of each control device being manufactured with an in-built unique identifier. When installing the control devices, an electrician/engineer may inspect each control device to obtain the unique identifier and program the smart network controller accordingly. However, such inspection and programming is time consuming and requires a certain level of skill to undertake accurately. It may also be difficult to reprogram a network if a control device fails and it is necessary to replace the failed control device. It may also be difficult to add additional control devices to a network once the network has been established, therefore adding an additional burden if, for example, it was necessary to add a new lighting device to a smart network.

An alternative method of creating a smart network may comprise a master control device detecting each individual control device to which it is connected, the master control device then randomly assigning unique identifiers to each individual control device. However, it may then be necessary for the installation engineer to program the network by matching each control device with a network element. For example, in a lighting system, each control device may need to be matched to the associated light unit. This may involve the master control sending a command to a first individual control device and the engineer being required to inspect the various network elements in order to see which element has reacted to the command. The command may, for example, result in a light unit being switched on. Such a method may take a significant time to configure a network, and there may also be problems with adding or replacing individual control devices as already mentioned above.

The present invention seeks to mitigate the abovementioned problems.

SUMMARY OF THE INVENTION

The present invention provides, according to a first aspect, a method of creating a network of control devices, the method comprising the steps of: providing a master control device and a plurality of programmable control devices; the master control device and the plurality of programmable control devices comprising wireless communication apparatus configured for wireless communication between the master control device and the plurality of programmable control devices; bringing the master control device into close proximity to one or more of the programmable control devices; and the master control device sending one or more configuration commands to the one or more programmable control devices.

The configuration command may include the assignment of a unique identifier to each of the one or more programmable control devices into which the master control device is brought into close proximity. The configuration command may include a default setup command for the programmable control device. For example, if the programmable control device is a light dimmer, the command may include configuration settings for dimming up or dimming down the light. If the programmable control device is a light switch, to switch the light on and off. The command may include configuration information including dimming speed and maximum and minimum brightness settings.

The method may allow an engineer to easily configure a programmable control device, including assigning a unique identifier to that programmable control device, prior to the installation of the control device in association with a network element, for example a light unit. The engineer may then easily set up a smart network, as they know the unique identifier associated with each programmable control device, and they know to which network element the programmable control device has been connected. The configuration command may result in a programmable control device being added to a network of control devices. In an alternative arrangement, the configuration command may result in a programmable control device being removed from a network of control devices. Such flexibility allows an engineer to easily adapt a network of control devices depending on the required circumstances.

The method may also include the step of the master control device allocating unique identifiers to one or more network elements.

The method may comprise the wireless communication between the master control device and the programmable control devices being near field communication.

The near field communication may require the master control device and the programmable control devices being no further than 10 m apart, no further than 5 m apart, no further than 1 m apart, no further than 10 cm apart, or no further than 5 cm apart. The master control device may comprise a powered near field communication device. The programmable control devices may comprise an unpowered near field communication chip, also known as a "tag".

The method may comprise the master control device communicating with a first programmable control device, then following the communication with a first programmable control device, communicating with a second programmable control device. This may be repeated until the master control device has communicated with each of the plurality of programmable control devices.

The method may comprise the master control device communicating with a first programmable control device and a second programmable control device simultaneously.

The method may comprise the master control device communicating with each of the plurality of programmable control devices simultaneously.

A programmable control device may be a light switch, a light drive unit, a control switch or thermostat for a heating or cooling apparatus, or a power switch for an appliance such as a kettle, oven, or washing machine, or a master system within an alarm system network.

A network element may be a light unit, a heating or cooling device such as a radiator or air conditioning unit, or an appliance such as a kettle, oven, or washing machine, or a sensor unit within an alarm system network.

According to a second aspect, the present invention provides a master control device, the master control device comprising a processing unit and a wireless transmission unit, the wireless transmission unit arranged to transmit wireless signals and receive wireless signals, wherein the processing unit is programmed to control the wireless transmission unit and send configuration signals to a plurality of programmable control devices thereby creating a network of programmable control devices in accordance with the first aspect of the invention.

The master control device may be a smart phone. The wireless transmission unit may be arranged to transmit configuration signals via any suitable near field communication protocol.

According to a third aspect, the invention provides a programmable control device, the programmable control device comprising a programmable memory and a wireless communication unit, the wireless communication unit arranged to receive wireless signals from a master control device in accordance with the second aspect of the invention and transmit wireless signals in response to receiving such a wireless signal, thereby creating a network of programmable control devices in accordance with the first aspect of the invention. The programmable memory may be programmed in accordance with a configuration signal sent by and received from a master control device as described in accordance with the second aspect of the invention. The wireless transmission unit may be arranged to transmit configuration signals via any suitable near field communication protocol.

According to a fourth aspect, the invention provides a computer program for instructing a master control device in the form of a computer to carry out the method of creating a network according to the first aspect of the invention.

It will of course be appreciated that features described in relation to one aspect of the present invention may be incorporated into other aspects of the present invention. For example, the method of the invention may incorporate any of the features described with reference to the apparatus of the invention and vice versa.

DETAIL DESCRIPTIONS OF THE INVENTION

Figure 1:
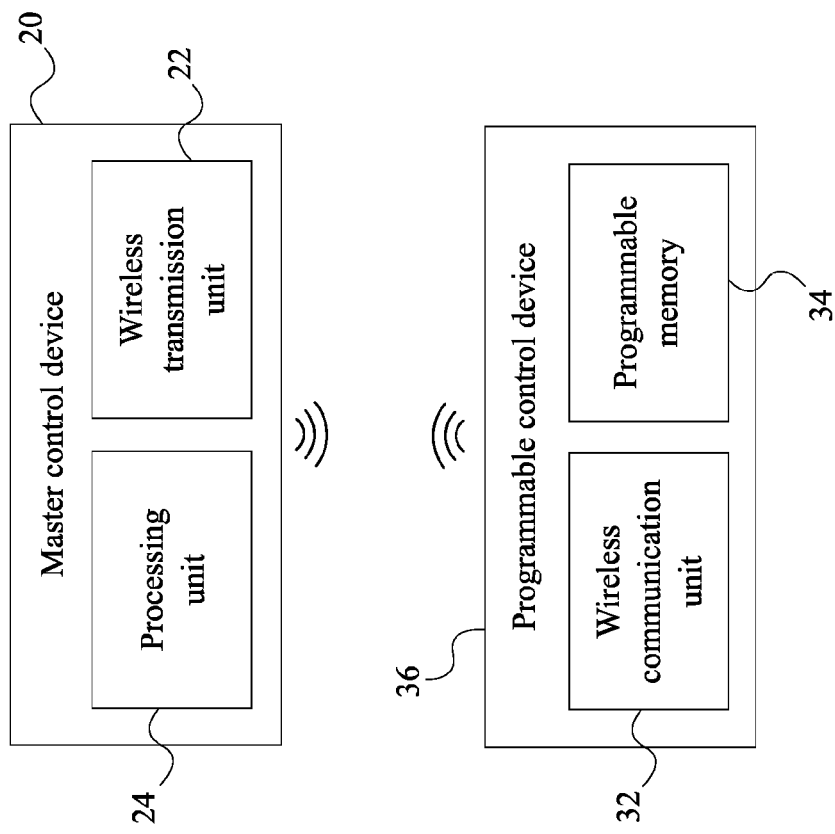
FIG. 1 is a diagram depicting a master control device communicably coupled to an arbitrary control device.

All illustrations of the drawings are for the purpose of describing selected versions of the present invention and are not intended to limit the scope of the present invention.

The present invention is a method and apparatus for creating a smart network of control devices 10. A master control device 20 is configured to send wireless radio frequency (RF) signals to a plurality of programmable control devices 30. In reference to FIG. 1, the master control device 20 comprises a wireless transmission unit 22 and a processing unit 24, wherein the processing unit 24 is programmed to control the wireless transmission unit 22 and send a configuration signal to the plurality of control devices; the wireless transmission unit 22 being configured to both transmit wireless signals and receive wireless signals. The configuration signal can be used to add devices to a network of control devices 10, or delete devices from the network of control devices 10. As such, the configuration signal includes either an add command or a delete command.

Figure 2:
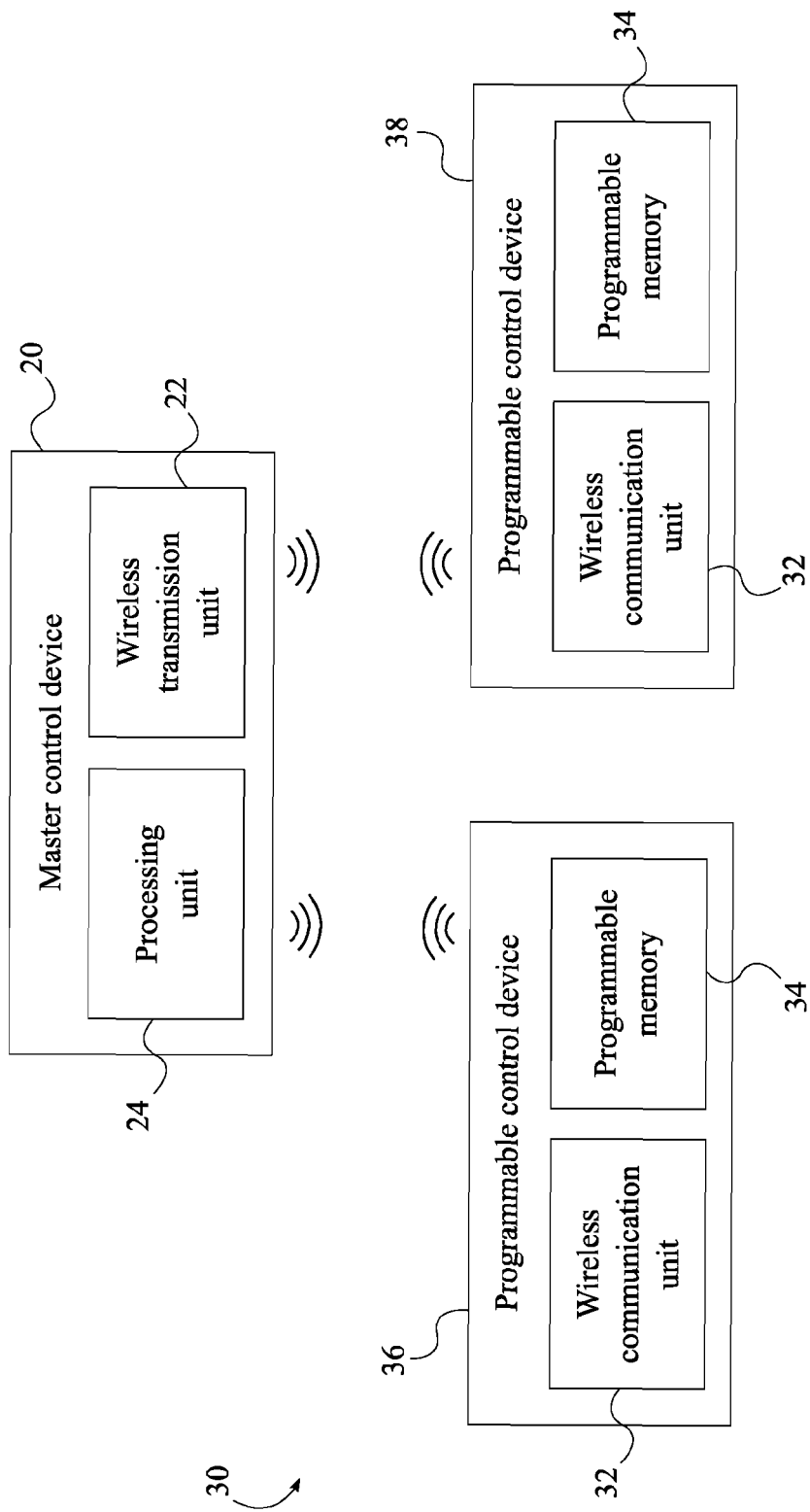
FIG. 2 is a diagram depicting the master control device communicably coupled to the arbitrary control device and a subsequent control device.

Meanwhile, each of the plurality of programmable control devices 30 comprises a wireless communication unit 32 and a programmable memory 34, as depicted in FIG. 2. The wireless communication unit 32 of each of the plurality of programmable control devices 30 is configured to receive wireless signals and transmit wireless signals in response to receiving the configuration signal. The programmable memory 34 is electronically connected to the wireless communication unit 32 and is arranged to be programmed in accordance with the configuration signal sent by and received from the master control device 20. The programmable memory 34 comprises a memory driver 46 and a non-volatile memory, wherein the non-volatile memory may be Electrically Erasable Programmable Read-Only Memory (EEPROM), flash, or any other suitable non-volatile memory type.

In the preferred embodiment of the present invention, the master control device 20 communicates with each of the plurality of programmable control devices 30 using near field communication. The wireless transmission unit 22 is a powered near field communication device, while the wireless communication unit 32 of each of the programmable control devices is an unpowered near field communication device; the wireless communication unit 32 comprising an antenna circuitry that is arranged to receive RF signals and utilize the RF signals to power the programmable control device. When the master control device 20 is within close proximity of one of the plurality of programmable control devices 30, the RF signals are sent from the wireless transmission device and received by the antenna circuitry, wherein the wireless communication device is powered and can respond and transmit RF signals back to the wireless transmission unit 22.

Figure 5:
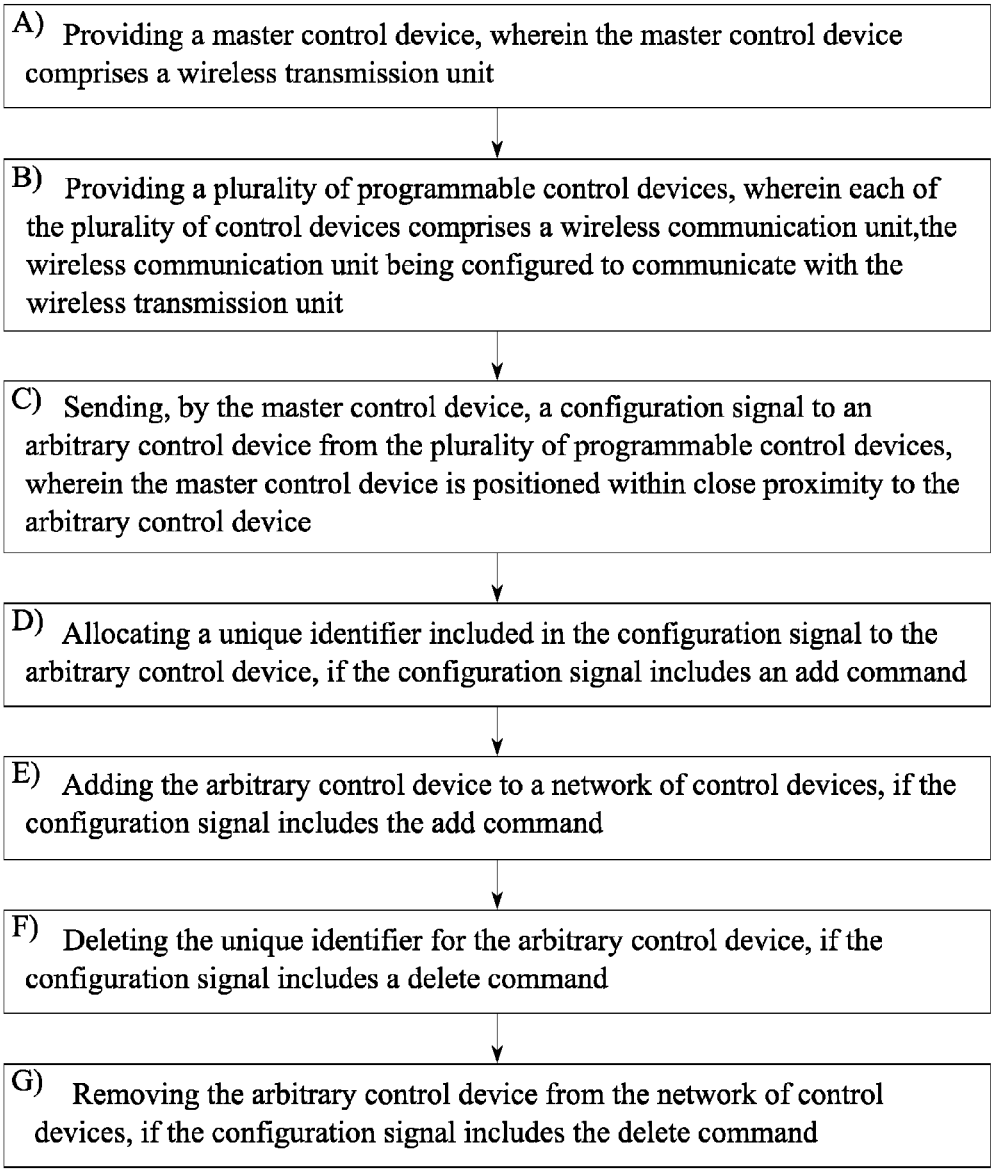
FIG. 5 is a flowchart depicting the steps for using a master control device to add and remove an arbitrary control device within a network of control devices.

In reference to FIG. 5, in order to setup the network of control devices 10, a user first selects an arbitrary control device 36 from the plurality of programmable control devices 30. The master control device 20 is then positioned within close proximity to the arbitrary control device 36 in order to communicably couple the master control device 20 to the arbitrary control device 36. Once communicably coupled, the master control device 20 sends the configuration signal to the arbitrary control device 36, wherein the configuration signal includes the add command. The configuration signal further includes a unique identifier that is allocated to the arbitrary control device 36. Once the unique identifier is allocated to the arbitrary control device 36, the arbitrary control device 36 is added to the network of control devices 10, wherein the master control device 20 can be utilized to command the arbitrary control device 36.

The arbitrary control device 36 is communicably coupled to a network element, such as a light or speaker, wherein the arbitrary control device 36 governs the network element. When the master control device 20 sends a command to the arbitrary control device 36, the arbitrary control device 36 carries out the appropriate actions to manipulate the network element. For example, if the network element is a light, then the arbitrary control device 36 can be commanded to turn the light on and off, wherein the arbitrary control device 36 operates a switch to provide power to the light. As another example, if the network element is a speaker, then the arbitrary control device 36 can be commanded to turn the volume up and down, wherein the arbitrary control device 36 operates a potentiometer to adjust the volume.

Figure 6:
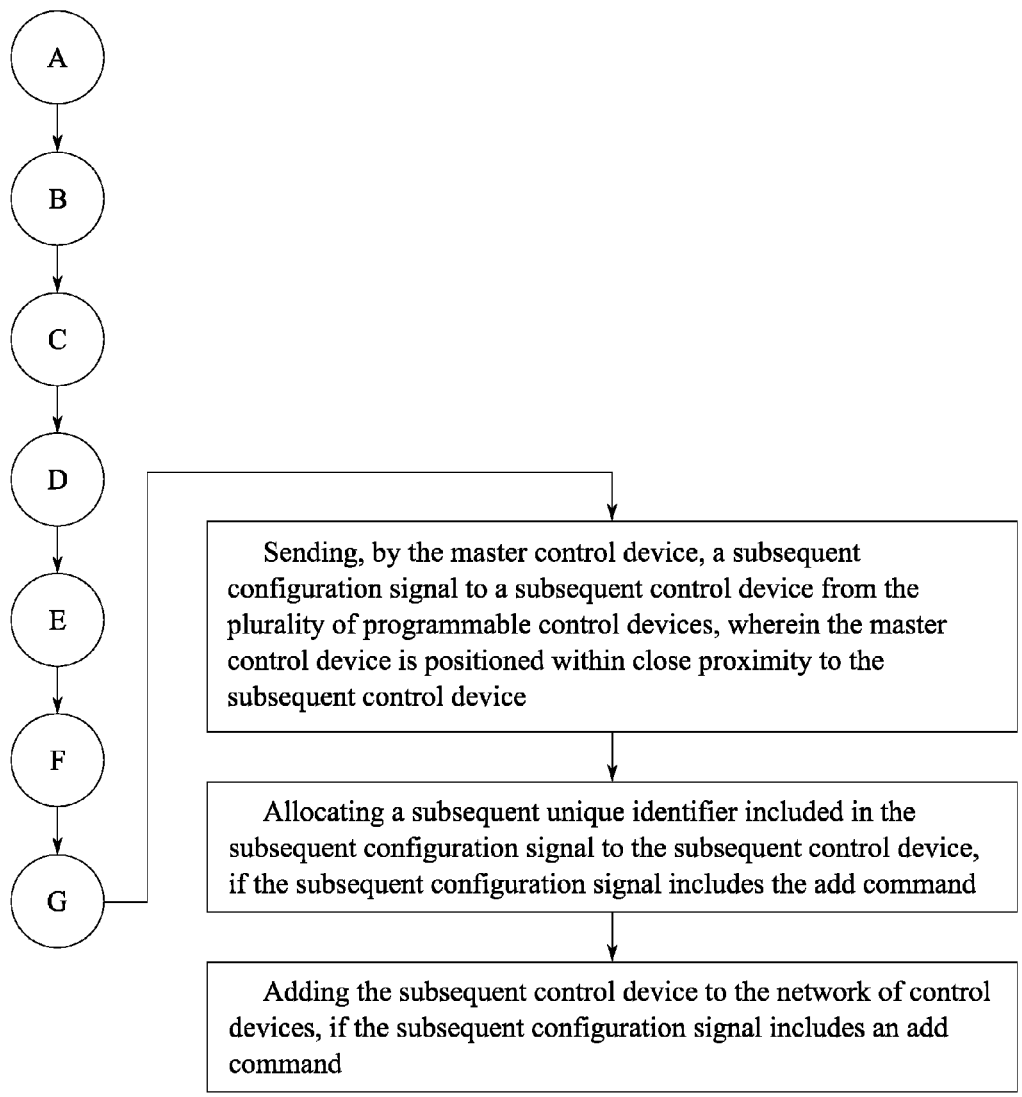
FIG. 6 is a flowchart thereof, further depicting steps for adding a subsequent control device to the network of control devices.

In reference to FIG. 6, once the arbitrary control device 36 has been added to the network of control devices 10, the user can proceed to add a subsequent control device 38 to the network of control devices 10. To add the subsequent control device 38, the master control device 20 is first positioned within close proximity to the subsequent control device 38. The master control device 20 then sends a subsequent configuration signal to the subsequent control device 38, wherein the subsequent configuration signal includes an add command. The subsequent configuration signal further includes a subsequent unique identifier that is allocated to the subsequent control device 38. Once the subsequent unique identifier is allocated to the subsequent control device 38, the subsequent control device 38 is added to the network of control devices 10, wherein the master control device 20 can be utilized to command the subsequent control device 38.

Figure 8:
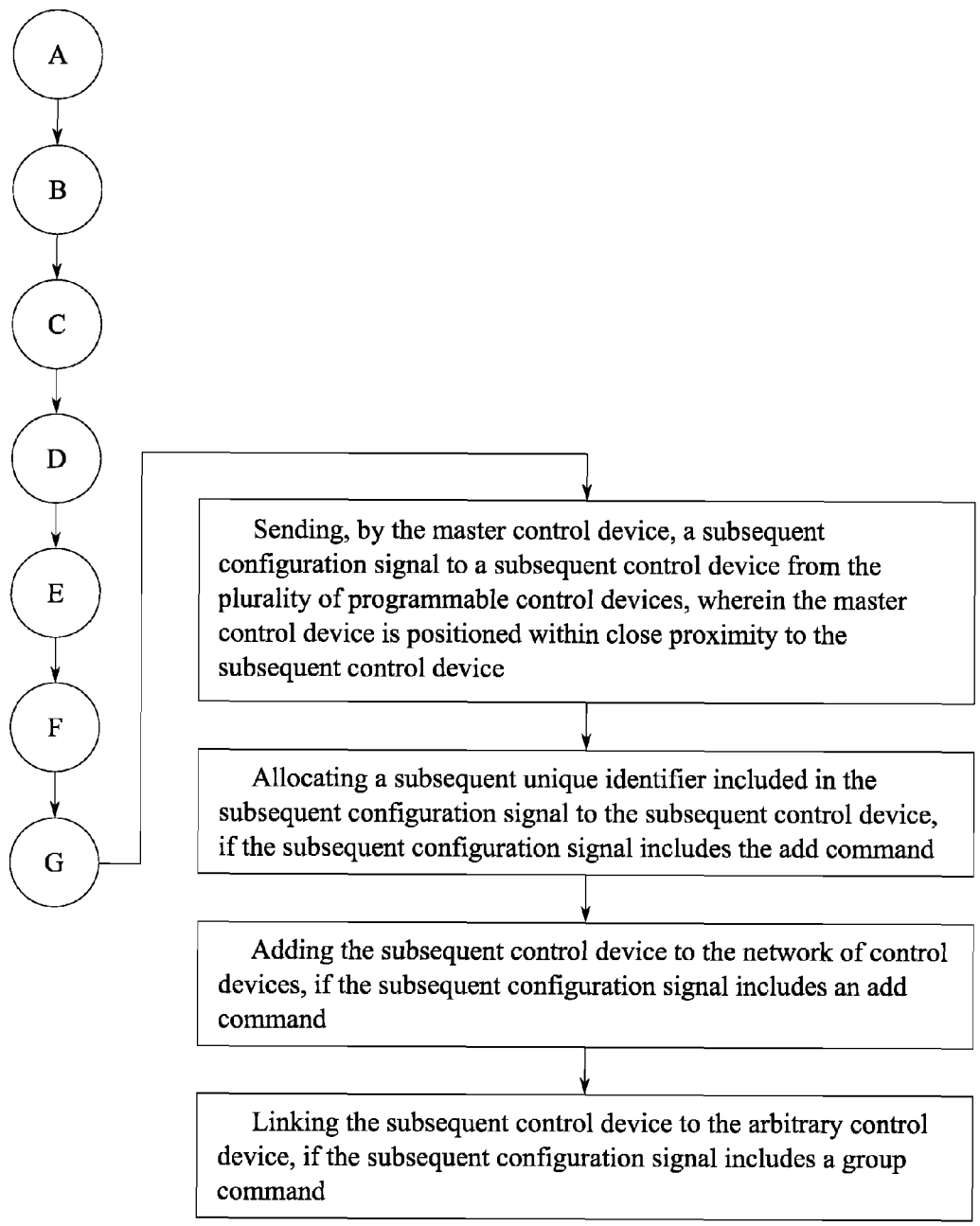
FIG. 8 is a flowchart thereof, further depicting steps for linking the subsequent control device to the arbitrary control device.

Additionally, and in reference to FIG. 8, the subsequent control device 38 can be linked to the arbitrary control device 36 within the network of control devices 10. By including a group command in the subsequent configuration signal, the subsequent control device 38 can be linked to the arbitrary control device 36, wherein the master control device 20 pairs, or groups, the arbitrary control device 36 and the subsequent control device 38 together. When pairing the arbitrary control device 36 with the subsequent control device 38, the unique identifier is combined with the subsequent unique identifier to form a group identifier. For example, if the unique identifier is "1" and the subsequent unique identifier is "A", then the group identifier for the arbitrary control device 36 and the subsequent control device 38 would be "1A". Alternatively, the group identifier can be uniquely determined, as opposed to combining the unique identifier with the subsequent unique identifier.

Figure 10:
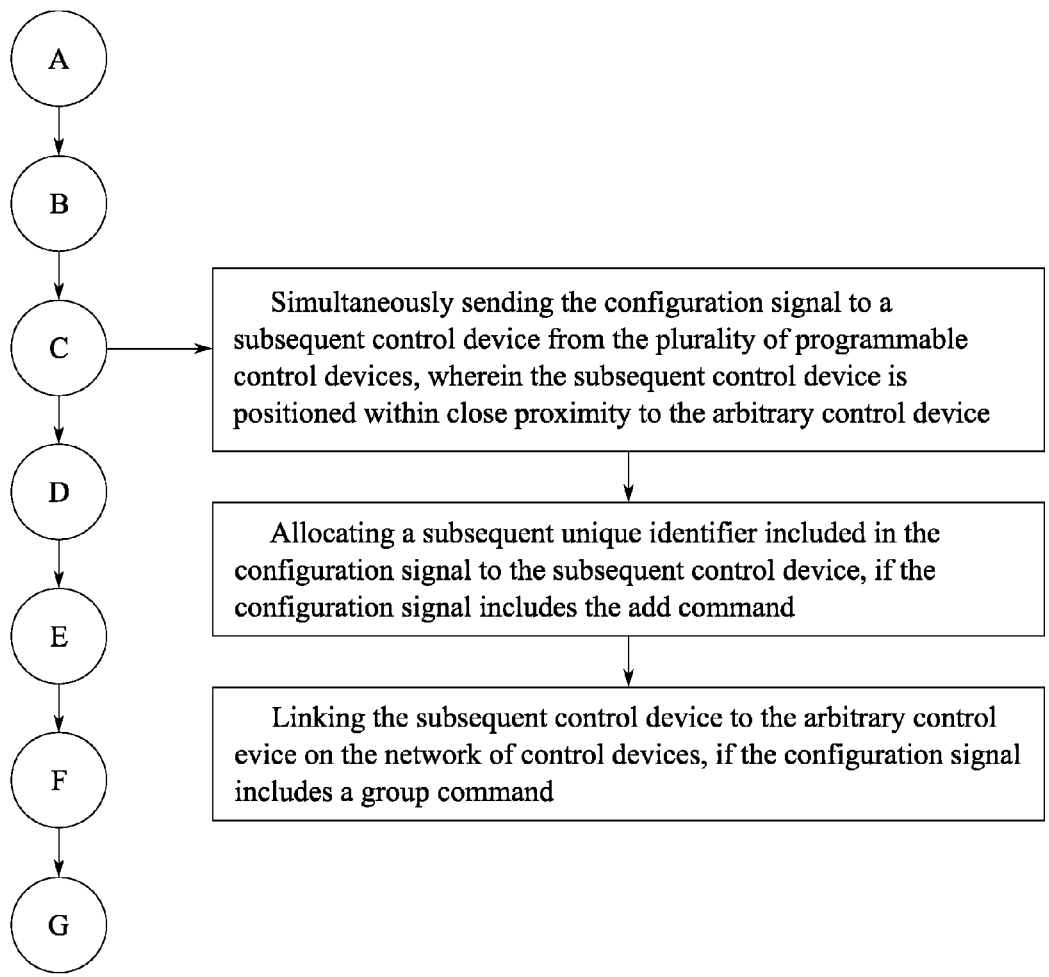
FIG. 10 is a flowchart thereof, further depicting steps for simultaneously adding the arbitrary control device and the subsequent control device to the network of control devices, and linking the subsequent control device to the arbitrary control device.

In some embodiments, it is also possible to simultaneously add the arbitrary control device 36 and the subsequent control device 38 to the network of control devices 10. In reference to FIG. 10, in such embodiments, the master control device 20 simultaneously sends the configuration signal to both the arbitrary control device 36 and the subsequent control device 38, wherein the configuration signal includes the add command; the master control device 20 being positioned within close proximity of both the arbitrary control device 36 and the subsequent control device 38. The configuration signal includes the unique identifier and the subsequent unique identifier, wherein the unique identifier and the subsequent unique identifier are allocated to the arbitrary control device 36 and the subsequent control device 38 respectively. Furthermore, if the arbitrary control unit and the subsequent control unit are to be paired, the master control device 20 can link the subsequent control device 38 to the arbitrary control device 36 on the network of control devices 10 when sending the configuration signal, wherein the configuration signal includes a group command.

Figure 7:
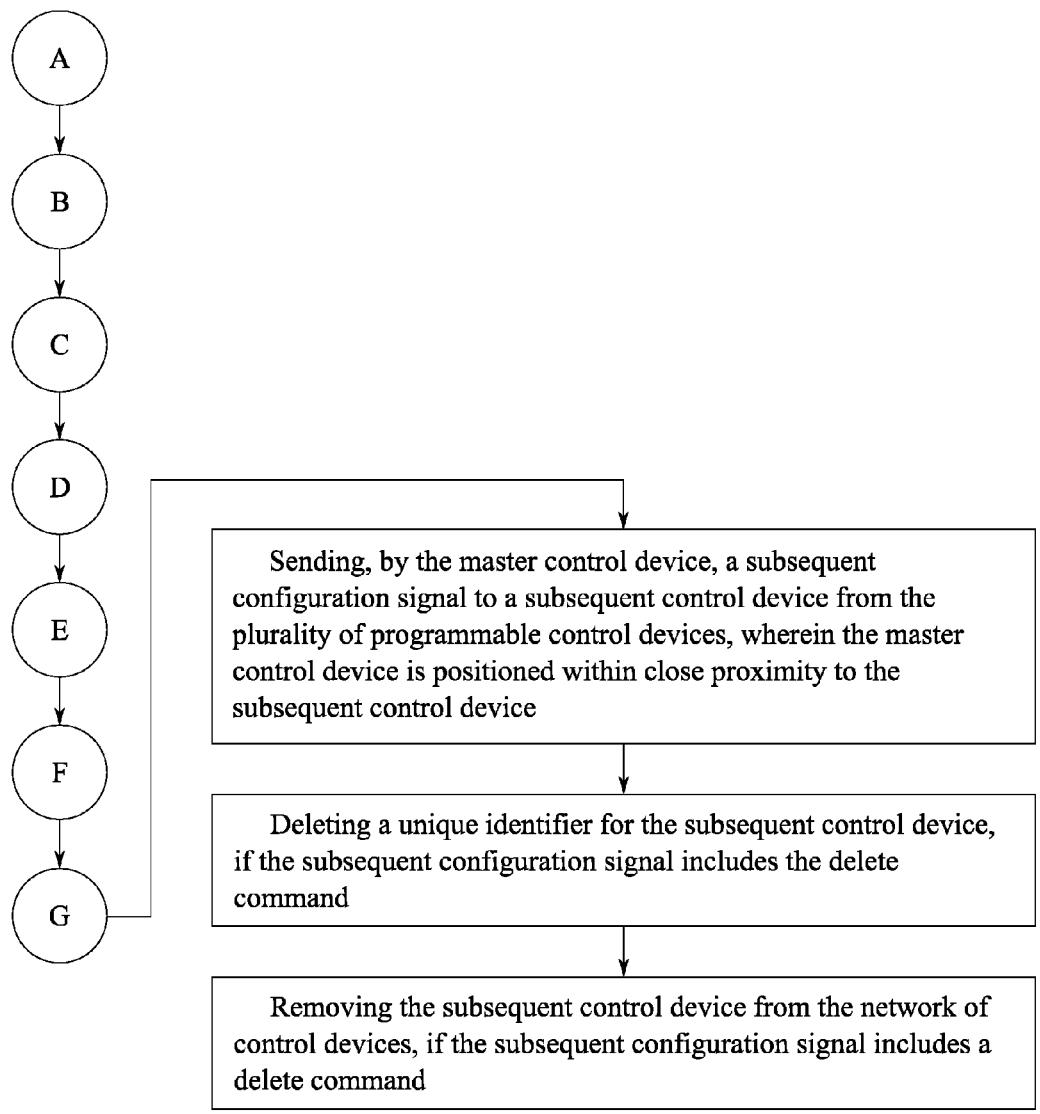
FIG. 7 is a flowchart thereof, further depicting steps for removing a subsequent control device from the network of control devices.

In reference to FIG. 7, in some situations it may be necessary to remove the arbitrary control device 36 from the network of control devices 10. This may be due to malfunction of the arbitrary control device 36, an upgrade in equipment, or any other reason for replacing the arbitrary control device 36. In order to remove the arbitrary control device 36, the master control device 20 sends the configuration signal to the arbitrary control device 36, wherein the configuration signal includes a delete command. When the arbitrary control device 36 receives the configuration signal, the unique identifier for the arbitrary control device 36 is deleted and the arbitrary control device 36 is removed from the network of control devices 10. A new control device must then be added to the network of control devices 10 and paired with the network element in order for the master control device 20 to manipulate the network element.

Figure 9:
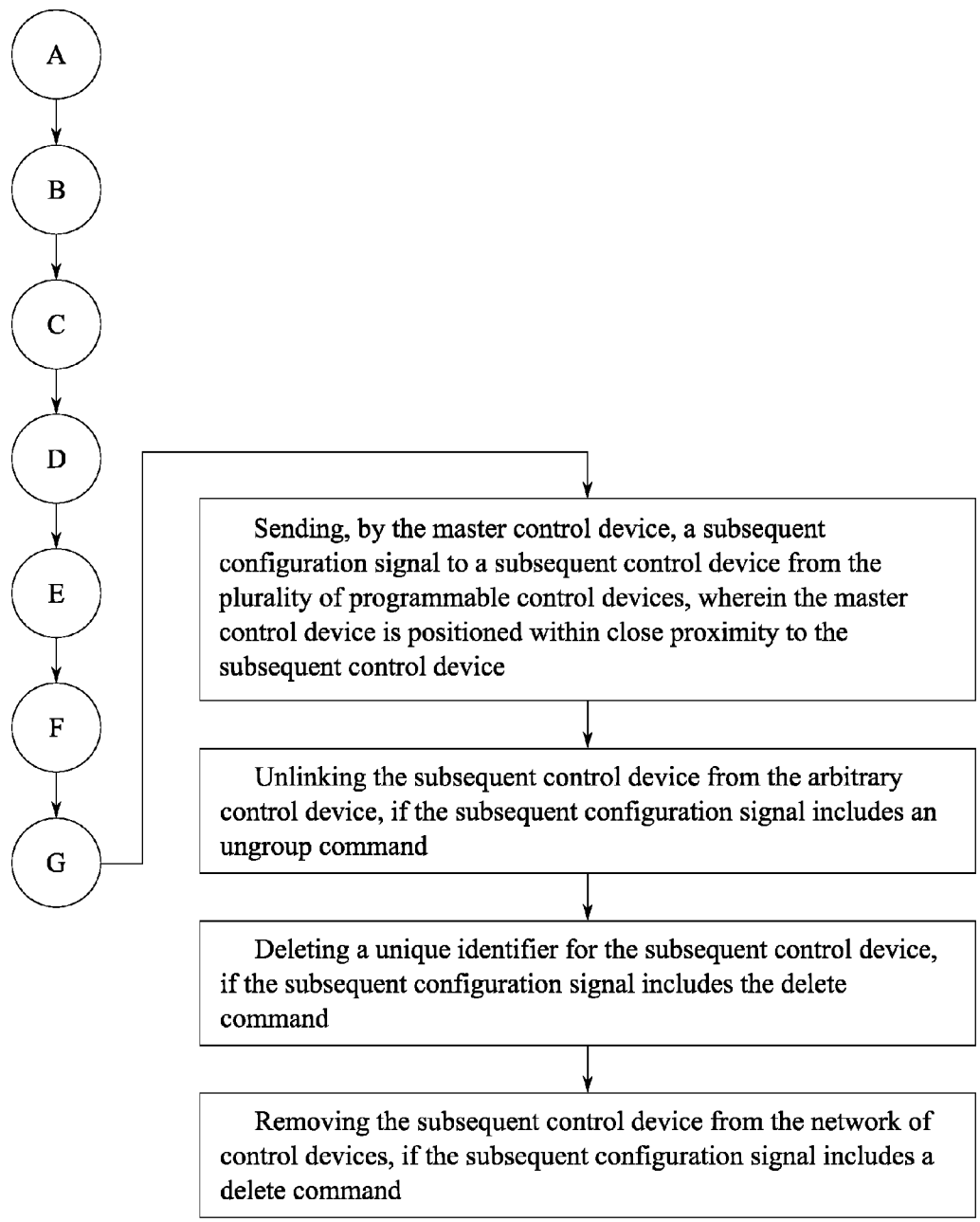
FIG. 9 is a flowchart thereof, further depicting steps for unlinking the subsequent control device from the arbitrary control device.

Similarly, and in reference to FIG. 9, it may be necessary to remove the subsequent control device 38 form the network of control devices 10. In order to remove the subsequent control device 38, the master control device 20 sends the subsequent configuration signal to the subsequent control device 38, wherein the configuration signal includes a delete command. When the subsequent control device 38 receives the subsequent configuration signal, the subsequent unique identifier for the subsequent control device 38 is deleted and the subsequent control device 38 is removed from the network of control devices 10. If the subsequent control device 38 is linked to the arbitrary control device 36, then the subsequent configuration signal includes an ungroup command, wherein the subsequent control device 38 is unlinked from the arbitrary control device 36 prior to removing the subsequent control device 38 from the network of control devices 10.

Figure 11:
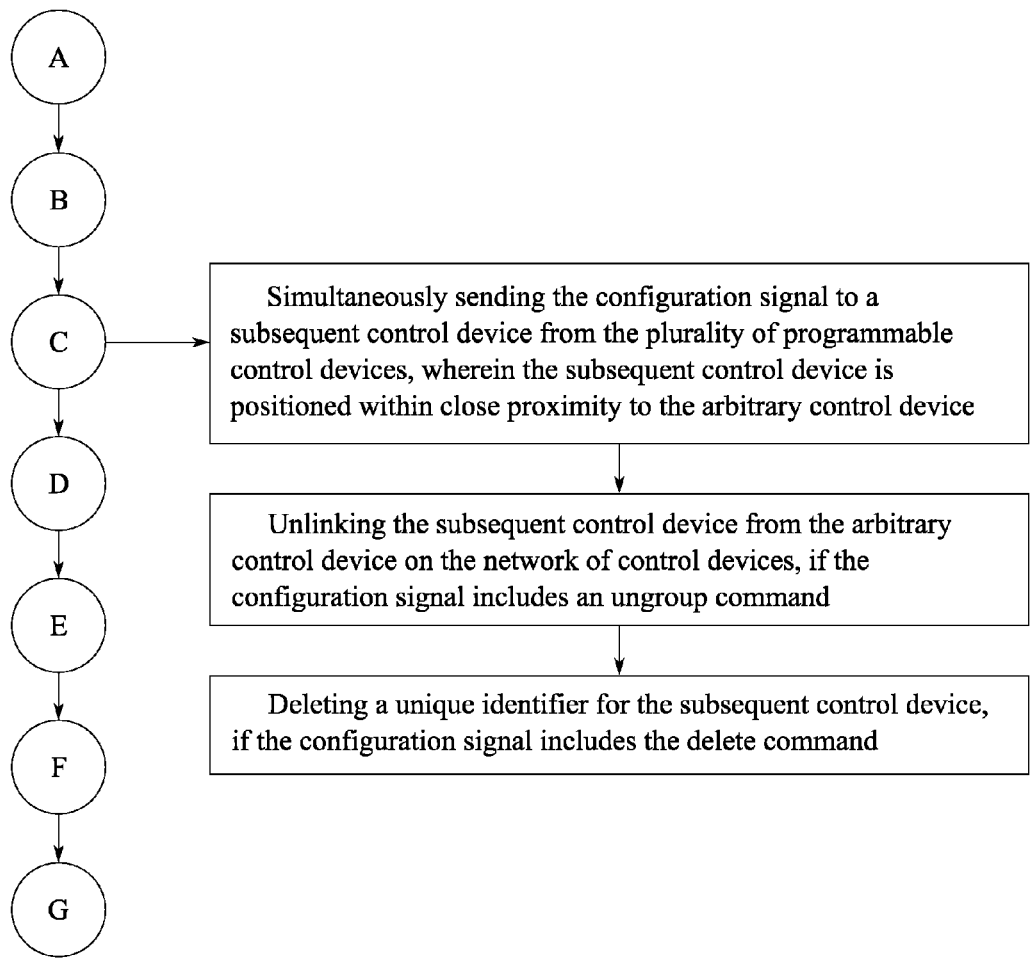
FIG. 11 is a flowchart thereof, further depicting steps for simultaneously removing the arbitrary control device and the subsequent control device from the network of control devices.

In reference to FIG. 11, in some embodiments, it is possible to unlink the subsequent control device 38 from the arbitrary control device 36 on the network of control devices 10 by simultaneously sending the configuration signal to the arbitrary control device 36 and the subsequent control device 38. In order to unlink the arbitrary control device 36 and the subsequent control device 38, the configuration signal includes an ungroup command; the arbitrary control device 36 and the subsequent control device 38 being positioned within close proximity to the master control device 20 when the configuration signal is transmitted. Furthermore, if the configuration signal also includes the delete command, then the arbitrary control device 36 and the subsequent control device 38 can be simultaneously removed from the network of control devices 10, wherein the unique identifier and the subsequent unique identifier are simultaneously deleted for the arbitrary control device 36 and the subsequent control device 38 respectively.

Figure 12:
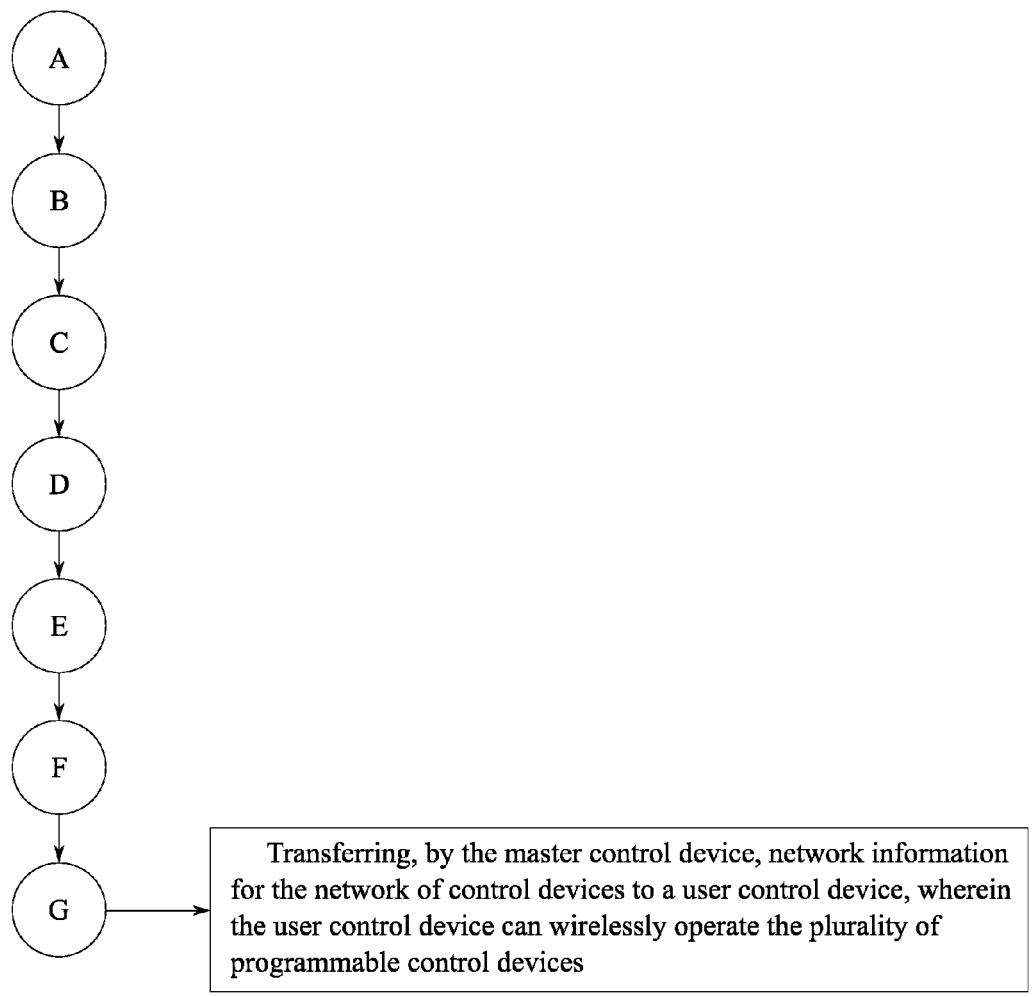
FIG. 12 is a flowchart thereof, further depicting the step for transferring network information from the master control device to a user control device.

When each of the plurality of programmable control devices 30 is added to or removed from the network of control devices 10, the master control device 20 stores network information. The network information includes each of the plurality of programmable control devices 30 that is present on the network of control devices 10, as well as a unique identifier for each of the plurality of programmable control devices 30. In reference to FIG. 12, once the network information is stored, the master control device 20 can transfer the network information to a user control device 80, wherein the user control device 80 can wirelessly operate each of the plurality of programmable control devices 30 that has been added to the network of control devices 10. In this way, an engineer, or other expert, can program and install the plurality of programmable control devices 30, and then share the network information with a client; the engineer operating the master control device 20 and the client operating the user control device 80.

Figure 3:
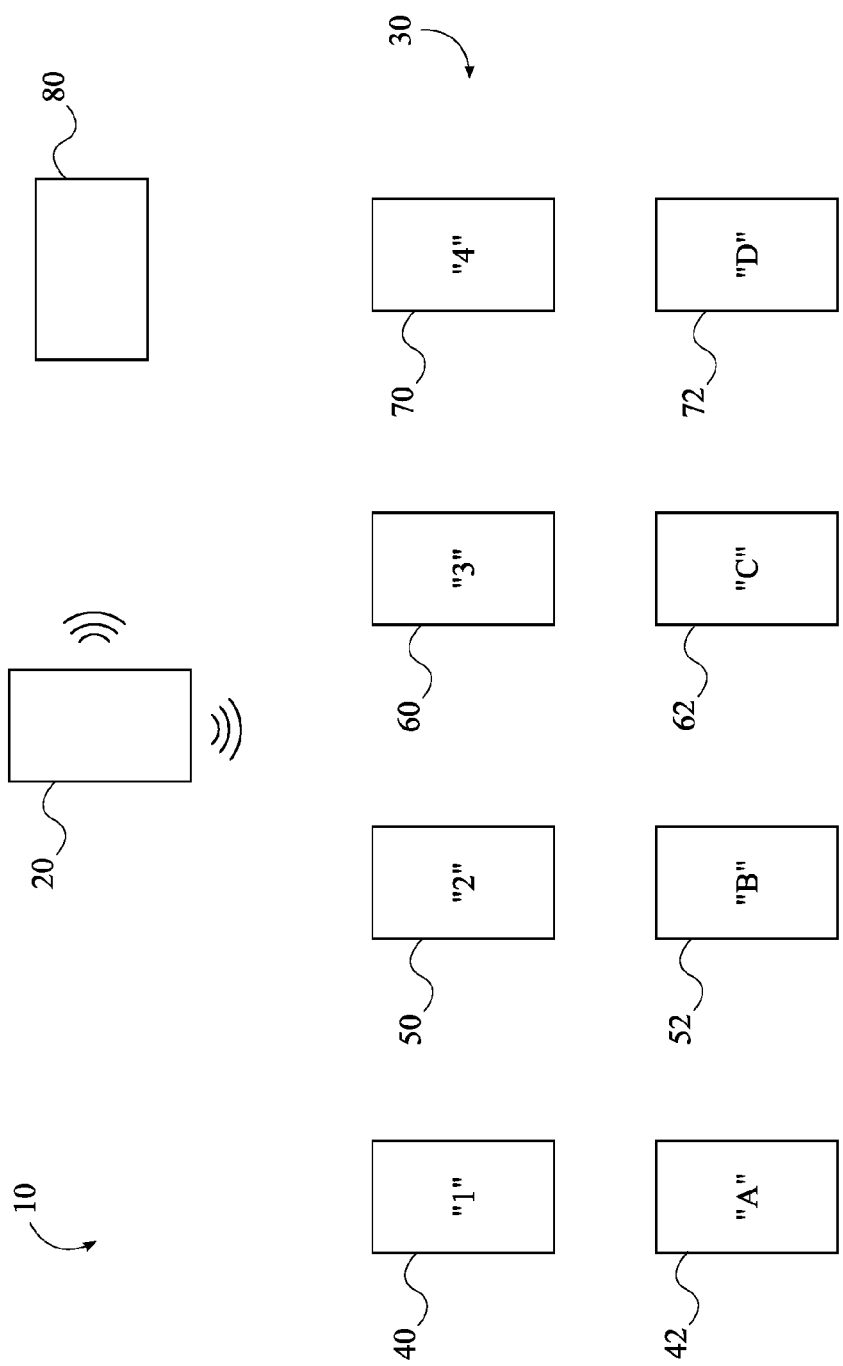
FIG. 3 is a diagram of the master control device communicably coupled with a network of control devices and a user control device.

FIG. 3 shows a network system according to one embodiment of the present invention. The network system comprises the master control device 20 and the plurality of programmable control devices 30; the plurality of programmable control devices 30 comprising a first programmable control device 40, a second programmable control device 50, a third programmable control device 60, and a fourth programmable control device 70. In this embodiment, each of the plurality of programmable control devices 30 is a light switch 44. The network system further comprises a first light unit 42, a second light unit 52, a third light unit 62, and a fourth light unit 72. The first light unit 42, the second light unit 52, the third light unit 62, and the fourth light unit 72 are each a network element and each comprise a light emitting diode (LED) and a LED driver 46. In alternative embodiments, the LED and LED driver 46 may be separate elements which are joined together during the installation of the light units.

In order to set up the network system, an engineer brings the master control device 20 into close proximity to the first programmable control device 40 (the first programmable control device 40 being the arbitrary control device 36) and uses the master control device 20 to send the configuration signal to the first programmable control device 40. The master control device 20 may be a smart phone with the appropriate software or "APP" installed. The configuration signal includes the unique identifier, and the first programmable control device 40 is allocated the unique identifier being "1". The engineer may then repeat the process, bringing the master control device 20 into close proximity to the second programmable control device 50 (the second programmable control device 50 being the subsequent control device 38), sending the subsequent configuration signal from the master control device 20 to the second programmable control device 50. The subsequent configuration signal allocates the second programmable control device 50 the subsequent unique identifier being "2". The engineer then repeats the process, such that the third programmable control device 60 is allocated the identifier "3" and the fourth programmable control device 70 is allocated the identifier "4".

Once each of the programmable control devices has each been allocated a unique identifier, the engineer may install the plurality of programmable control devices 30. The first programmable control device 40 is linked to the first light unit 42, such that the first programmable control device 40 can turn the first light unit 42 on and off. The master control device 20 may allocate network element identifiers to each of the light units in the same way as was done for the plurality of programmable control devices 30. The first light unit 42 may have the network element identifier "A", though this may often be expanded to indicate the location of the light unit. So "A" may in fact be "Entrance Porch", or "Kitchen". The engineer repeats this step, with the second programmable control device 50 being linked with the second light unit 52 having the network element identifier "B"; the third programmable control device 60 being linked with the third light unit 62 having the network element identifier "C"; and the fourth programmable control unit being linked with the fourth light unit 72 having the network element identifier "D".

Therefore, the engineer ends up with the network of control devices 10, wherein each of the programmable control devices and the associated light unit is provided with a unique group identifier (e.g. "1A", "2B", "3C", and "4D"). The master control device 20 may then be used to send control signals to each of the plurality of programmable control devices 30, thereby controlling the lighting provided by the various light units. The master control device 20 may transfer the network information to the user control device 80, which may be used by a user to control the light units. The user control device 80 may be a smart phone or tablet device, or a personal computer with a suitable "APP" or computer program installed. The plurality of programmable control units may receive information via any suitable wireless means, for example from a wireless internet hub within range of the plurality of programmable control units. Therefore, the user may control the light units despite being in a remote location.

If it is necessary to remove a programmable control device from the network of control devices 10, an engineer may send the configuration signal with the delete command from the master control device 20 to the arbitrary control device 36 in question, deleting the unique identifier. In order to do this, the engineer simply needs to bring the master control device 20 into close proximity to the arbitrary control device 36 and select the delete function on the master control device 20. One reason to delete a programmable control device from the network of control devices 10 could be due to malfunction of the programmable control device. A replacement programmable control device may then be programmed with a new unique identifier and paired with the light unit which requires the replacement programmable control unit. The master control device 20 may then update the network information and send the new configuration information to the user control unit in order that the network may be controlled as normal from the user's viewpoint.

The invention also allows additional programmable control units and light units to be added to the network of control units, by simply repeating the steps of providing an identifier for the programmable control device and light unit as described above. In alternative embodiments, a programmable control device may be linked to one or more light units.

Figure 4:
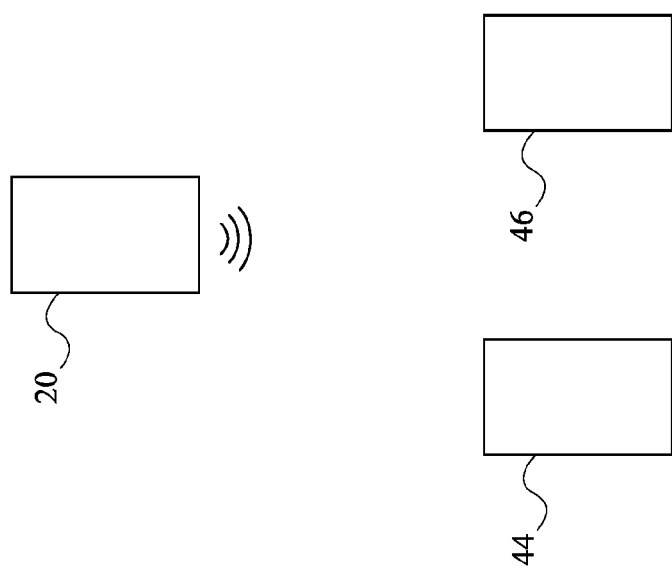
FIG. 4 is a diagram depicting the master control device simultaneously communicating with an arbitrary control device and a subsequent control device.

In an alternative embodiment as shown in FIG. 4, the apparatus depicted in FIG. 1 could be used to create the network of control devices 10 by sending a single "group" signal simultaneously to the plurality of programmable control devices 30. For example, one programmable control device could be a light switch 44, and another programmable control device a driver 46 for a light unit; the light switch 44 being the arbitrary control device 36 and the driver 46 being the subsequent control device 38. It may be desirable to "link" the light switch 44 and the driver 46 together, and this may be done by placing the light switch 44 and the driver 46 in close proximity, then sending a "group" signal via the master control device 20, wherein the master control device 20 is in close proximity to the light switch 44 and the driver 46. This provides a simple and easy way for an engineer to link the light switch 44 and the driver 46 prior to installation, and may require no further programming steps to set up the network of control devices 10. In a similar process, the engineer may "unlink" the light switch 44 and the driver 46 by bringing the light switch 44 and the driver 46 into close proximity to the master control device 20 and sending an "ungroup" signal.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The skilled person will appreciate that whilst the invention has been described in relation to light units and the control of the light units, the method and apparatus is equally applicable to any devices which may be controlled in a smart network. Such devices include, but are not limited to, an alarm sensor and alarm control system, heating and cooling devices such as radiator and air conditioning units, and domestic appliances such as kettles, dishwashers, washing machines, etc. A network may be created including a variety of devices or appliances, all of which may be controlled from a single user interface device.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

Although the invention has been explained in relation to its preferred embodiment, it is to be understood that many other possible modifications and variations can be made without departing from the spirit and scope of the invention as hereinafter claimed.

What is claimed is:

1. A method of creating a network of control devices, the method comprises the steps of:
   providing a master control device, wherein the master control device comprises a wireless transmission unit;
   providing a plurality of programmable control devices, wherein each of the plurality of control devices comprises a wireless communication unit, the wireless communication unit communicating with the wireless transmission unit;
   sending, by the master control device, a configuration signal to an arbitrary control device from the plurality of programmable control devices, wherein the master control device is positioned within close proximity to the arbitrary control device;
   allocating a unique identifier included in the configuration signal to the arbitrary control device, if the configuration signal includes an add command;
   adding the arbitrary control device to the network of the control devices, if the configuration signal includes the add command;
   deleting the unique identifier for the arbitrary control device, if the configuration signal includes a delete command; and
   removing the arbitrary control device from the network of the control devices, if the configuration signal includes the delete command.

2. The method of creating a network of control devices, the method as claimed in claim 1 further comprises the steps of:
   sending, by the master control device, a subsequent configuration signal to a subsequent control device from the plurality of programmable control devices, wherein the master control device is positioned within close proximity to the subsequent control device;
   adding the subsequent control device to the network of control devices, if the subsequent configuration signal includes an add command; and
   removing the subsequent control device from the network of control devices, if the subsequent configuration signal includes a delete command.

3. The method of creating a network of control devices, the method as claimed in claim 2 further comprises the step of:
   linking the subsequent control device to the arbitrary control device, if the subsequent configuration signal includes a group command.

4. The method of creating a network of control devices, the method as claimed in claim 2 further comprises the step of:
   unlinking the subsequent control device from the arbitrary control device, if the subsequent configuration signal includes an ungroup command.

5. The method of creating a network of control devices, the method as claimed in claim 2 further comprises the step of:
   allocating a subsequent unique identifier included in the subsequent configuration signal to the subsequent control device, if the subsequent configuration signal includes the add command.

6. The method of creating a network of control devices, the method as claimed in claim 2 further comprises the step of:
   deleting a unique identifier for the subsequent control device, if the subsequent configuration signal includes the delete command.

7. The method of creating a network of control devices, the method as claimed in claim 1 further comprises the steps of:
   simultaneously sending the configuration signal to a subsequent control device from the plurality of programmable control devices, wherein the subsequent control device is positioned within close proximity to the arbitrary control device;

linking the subsequent control device to the arbitrary control device on the network of control devices, if the configuration signal includes a group command; and unlinking the subsequent control device from the arbitrary control device on the network of control devices, if the configuration signal includes an ungroup command.

8. The method of creating a network of control devices, the method as claimed in claim 7 further comprises the step of:

allocating a subsequent unique identifier included in the configuration signal to the subsequent control device, if the configuration signal includes the add command.

9. The method of creating a network of control device, the method as claimed in claim 7 further comprises the step of:

deleting a unique identifier for the subsequent control device, if the configuration signal includes the delete command.

10. The method of creating a network of control devices, the method as claimed in claim 1 further comprises the step of:

transferring, by the master control device, network information for the network of control devices to a user control device, wherein the user control device can wirelessly operate the plurality of programmable control devices.

11. The method of creating a network of control devices, the method as claimed in claim 1, wherein the wireless transmission unit is a powered near field communication device and the wireless communication unit of the arbitrary control device is an unpowered near field communication device.

12. The method of creating a network of control devices, the method as claimed in claim 1, wherein the master control device comprises a processing unit programmed to control the wireless transmission unit and send the configuration signal to the plurality of programmable control devices.

13. The method of creating a network of control devices, the method as claimed in claim 1, wherein the wireless transmission unit transmits wireless signals and receive wireless signals.

14. The method of creating a network of control devices, the method as claimed in claim 1, wherein each of the plurality of programmable control devices comprises a programmable memory arranged to be programmed in accordance with the configuration signal sent by and received from the master control device.

15. The method of creating a network of control devices, the method as claimed in claim 1, wherein the wireless communication unit of each of the plurality of programmable control devices receive wireless signals and transmit wireless signals in response to receiving the configuration signal.

* * * * *